(12) United States Patent
Haffenden et al.

(10) Patent No.: US 6,226,189 B1
(45) Date of Patent: May 1, 2001

(54) DATA CARD HOUSING

(75) Inventors: Ian David Haffenden, Winchfield; David Smith, Camberley, both of (GB)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/120,058

(22) Filed: Jul. 21, 1998

(30) Foreign Application Priority Data

Jul. 25, 1997 (GB) .................................................. 9715811

(51) Int. Cl.[7] ...................................................... H04B 1/03
(52) U.S. Cl. .......................... 361/814; 361/801; 361/802; 455/90; 235/492; 439/260
(58) Field of Search .................................. 361/727, 728, 361/736, 737, 801, 802, 814; 439/259, 260, 326, 333; 455/90; 235/492

(56) References Cited

U.S. PATENT DOCUMENTS

| 4,404,464 | 9/1983 | Moreno | 235/438 |
|---|---|---|---|
| 4,820,186 | * 4/1989 | Fujii | 439/326 |
| 4,945,633 | 8/1990 | Hakanen et al. | 29/825 |
| 5,036,432 | 7/1991 | Uronen et al. | |
| 5,045,973 | 9/1991 | Saarela et al. | |
| 5,336,877 | * 8/1994 | Raab et al. | 235/475 |
| 5,655,917 | * 8/1997 | Kaneshige et al. | 439/155 |
| 5,699,406 | * 12/1997 | Liikanen et al. | 379/58 |
| 5,831,256 | * 11/1998 | De Larminat et al. | 235/486 |

FOREIGN PATENT DOCUMENTS

| 94 07 486 | 10/1995 | (DE) . |
|---|---|---|
| 0 247 368 A1 | 12/1987 | (EP) . |
| 0679002A | 10/1995 | (EP) . |
| 0 743 717 A2 | 11/1996 | (EP) . |
| 2143355 | 2/1985 | (GB) . |

* cited by examiner

Primary Examiner—Jayprakash N. Gandhi
(74) Attorney, Agent, or Firm—Perman & Green, LLP

(57) ABSTRACT

A data card housing (32) is provided which has a reading region (34) and a loading region (33). A data card is to be located at a reading position, and the reading region (34) has grooves (36) for guiding the card to the reading position. The loading region (33) has a supporting surface (31), and is arranged such that force can be applied to a major face of the card, to slide the card along the supporting surface (31) and into the guide grooves (36). Further, the reading region (34) is arranged such that force can be applied to the major face of the card to further slide the card to the reading position.

18 Claims, 6 Drawing Sheets

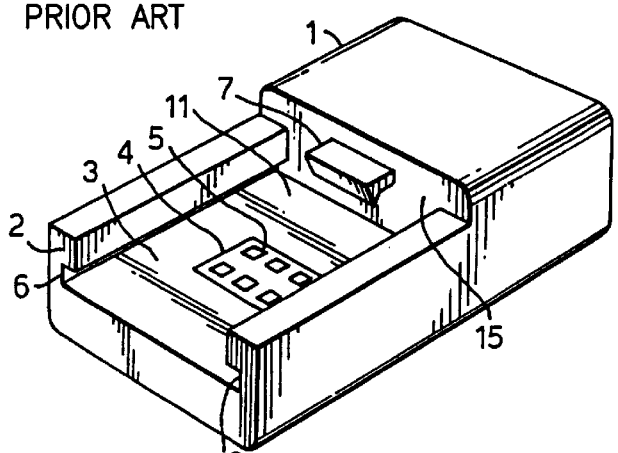
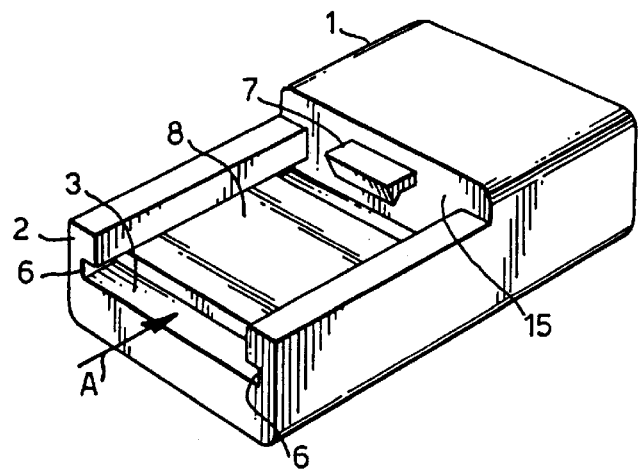
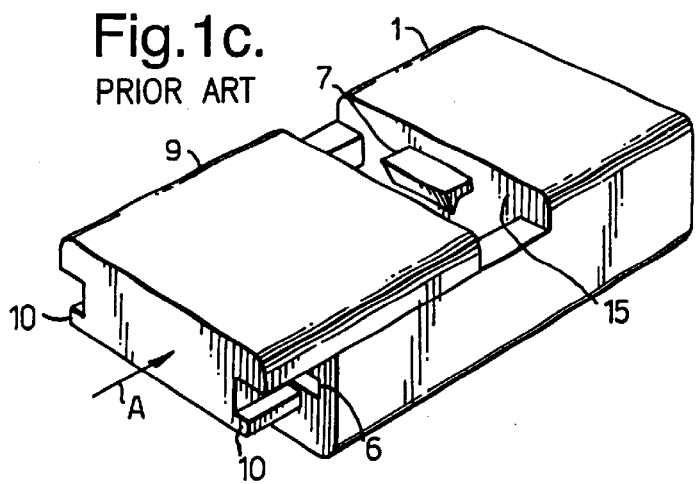

DATA CARD HOUSING

BACKGROUND OF THE INVENTION

This invention relates to a housing for a memory module. In particular, it relates to a housing for a data card, which may, for example, form part of a radiotelephone housing.

Memory modules such as data cards are known, for example, in cellular radiotelephones, which may be removably inserted into the telephone. A data card may be a passive memory card (i.e. essentially a ROM), or an active processor card (i.e. capable of processing information internally within the card). Data, such as identity information, is read from the inserted card and used in the subsequent operation of the telephone. The data card may be, for example, a "smart card" which is similar in size to a conventional plastic credit card and which includes a memory implemented as an integrated circuit device, commonly referred to as a "chip", in which information is stored. For this reason such cards are also often known as "chip cards".

The smart card may comprise a subscriber identity module (SIM). Also, In addition to subscriber identity information, such as the subscriber telephone number, and personal identification number (PIN), the smart card may store for example, call charge information (i.e. a charge meter), a telephone number index, or false PIN entries.

SIM cards are currently available in two sizes. The functionality of the SIM is the same for each, it is essentially that the physical dimensions are different. One is a credit card size SIM, the other is a plug-in SIM about 15 mm×20 mm.

The rationale behind the different sizes is that the credit card size is perceived as a convenient size for the user from a practical standpoint. However, the credit card size is relatively large, and smaller card sizes are needed as miniaturization continues to drive down the overall size of the terminal (i.e. the radio telephone unit itself). The plug-in SIM is intended to be semi-permanently installed in the cellular telephone.

FIGS. 1a to 1d of the accompanying drawings illustrate an arrangement for securing a SIM card in a mobile telephone, as disclosed in EP 0 679 002. This arrangement enables a credit-card sized SIM card 8 to be attached to a mobile telephone by providing the mechanical frame or casing 1 of the telephone with a pair of grooves 6, into which the SIM card 8 can be slid longitudinally with one end first. On the surface of the mobile telephone facing the SIM card 8 there is a SIM connector 4, with a number of generally flexible connector lugs 5 that make electrical contact with the contact pads on the respective surface of the SIM card 8. The grooves are also used to slide a rechargeable battery unit 9, having corresponding guides 10, into place so that once properly installed, the battery unit 9 essentially covers the SIM card. In the battery unit there is often included a spring that exerts a force against the surface of the mobile telephone or the SIM card 8 while the battery unit 9 is in place, in order to keep the battery unit (and the SIM card) tightly fastened. If the card is inserted wrong edge first, the no SIM card contact pads make contact with the connector lugs 5 of the connector 4.

One problem with the aforementioned arrangement is that it is adapted for use with full size SIM cards, which inhibit the reduction in size of a telephone. Also, the card cannot be readily inserted as it has to be aligned with the pair of grooves 6 before it can be slid longitudinally into position. Moreover, when the battery unit 9 of the mobile telephone is detached from the frame 1 of the mobile telephone, the SIM card tends to slide over the connector lugs 5. Since there is capacitive energy stored in the telephone, the SIM card 8 can be easily damaged while sliding over the connector lugs 5.

FIG. 2 of the accompanying drawings illustrates a known arrangement for securing a plug-in SIM card in a mobile telephone. On one surface of the mobile telephone facing the SIM card 24 there is a SIM connector 27 having connector lugs 26. The arrangement also comprises a hinged SIM card holder 22 with a lock 23 for maintaining the contacts of the SIM card in contact with the connector lugs 26 of the SIM connector 27. The SIM card 24 is inserted in the mobile telephone as follows. Firstly, the SIM card is placed in the holder 22 between the hinged portion 28 and the lock 23. Then the holder is pivoted to the SIM connector and locked by sliding the lock 23 until it connects with a corresponding part on the surface of the mobile telephone facing the SIM card 24. Finally, the SIM card compartment is closed by a cover 25.

The manufacturing process of a mobile telephone comprising such an arrangement is complicated by the number of parts of the hinged mechanism. Also, the arrangement requires a large compartment in the telephone casing. Further, the card 24 cannot be readily inserted as it has to be aligned between the hinged portion 28 and the lock 23 before it can be slid longitudinally into the position in which it needs to be locked. Moreover, the SIM card and compartment have to be adapted so that the card can only be put in the correct way around. Otherwise, incorrect contact between the card and mobile telephone might take place which could damage the card.

SUMMARY OF THE INVENTION

According to the present invention there is provided a data card housing, comprising a reading region in which a card is to be located at a reading position, the reading region having grooves for guiding the card to the reading position, and a loading region having a supporting surface, wherein the loading region is arranged such that force can be applied to a major face of the card, to slide the card along the supporting surface and into the guide grooves, and the reading region is arranged such that force can be applied to the major face of the card to further slide the card to the reading position.

The data card housing of the present invention can be sized for use with credit card sized or plug-in SIM cards. Advantageously, it is sized for the plug-in SIM card, as this allows it to be implemented in modern radiotelephones. Also, the housing enables simplified insertion and removal of a data card. For example, the loading region provides a supporting surface which can assist alignment of the data card with the guide grooves. Moreover, the loading and reading regions are arranged such that a force can be applied to a major face of the data card to assist the sliding of the card into and out of the reading position. Furthermore, the data card housing of the present invention is simple, and thus easily manufactured.

Preferably, the supporting surface of the loading region slopes downwards to the guide grooves. This prevents encroachment of valuable PCB space by the housing when it is implemented in a radiotelephone, for example. Also, the sloped loading region assists in aligning the data card with the guide grooves. Further, it prevents the data card accidentally sliding out of the reading position.

The housing may also comprise means for retaining the card in the reading position to further assist in preventing the accidental removal of the card. Such retaining means may take the form of protrusions in the supporting surface of the loading region and/or the guide grooves.

The housing may further comprise a data card connector. The data card connector preferably comprises connector contacts for contacting data card contacts to couple the data card contacts to circuitry, the connector contacts being positioned to contact respective data card contacts when the data card is located in the connector in a first orientation, and so that only one data card contact is contacted by any one of them when the data card is located in the connector in a second orientation, 180 degrees rotated from the first. Such a connector prevents the risk of damage to the data card if the data card is inserted incorrectly.

The connector contacts may be positioned so that, with the data card in the second orientation, only one connector contact is in contact with the said data card contact. In this event, when the data card is in the first orientation the said connector contact is in contact with any of the data card contacts. However, preferably, it is in contact with the said data card contact which makes contact with a connnector contact in the first orientation. This said connector contact may be positioned centrally. Alternatively, it may be positioned centrally with respect to only one of the major axes of the data card when the data card is located in the connector.

The data card connector may optionally further comprise a terminal positioned so that, with the data card in the second orientation, the terminal contact is in contact with a further data card contact. The terminal contact may be positioned centrally with respect to only one of the major axes of the data card when the data card is located in the connector. The provision of a terminal contact enables a small connector and data card to be used for the same connector arrangements.

The connector contacts and any terminal contacts of the data card may be symmetrical.

A data card housing may form part of the housing of a radiotelephone. Such a structure is easy to manufacture. A radiotelephone comprising a data card housing of the present invention may further comprise a detachable battery, which covers the data card housing when attached.

BRIEF DESCRIPTION OF THE DRAWINGS

Embodiments of the present invention are illustrated, by way of example, with reference to the accompanying drawings, of which:

FIGS. 1a–d illustrate a prior art arrangement for securing a credit card size SIM card in a mobile telephone;

DETAILED DESCRIPTION OF THE INVENTION

Figure 1D:
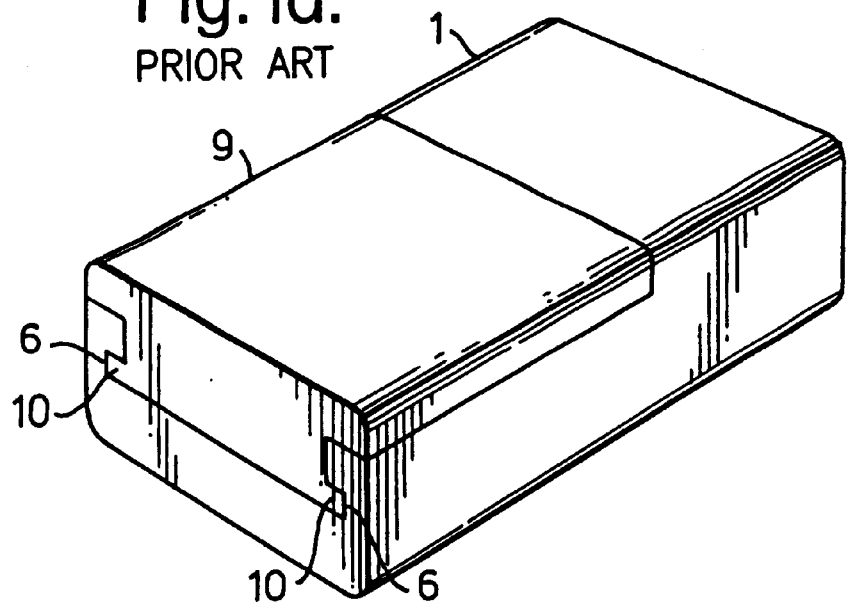
Figure 2:
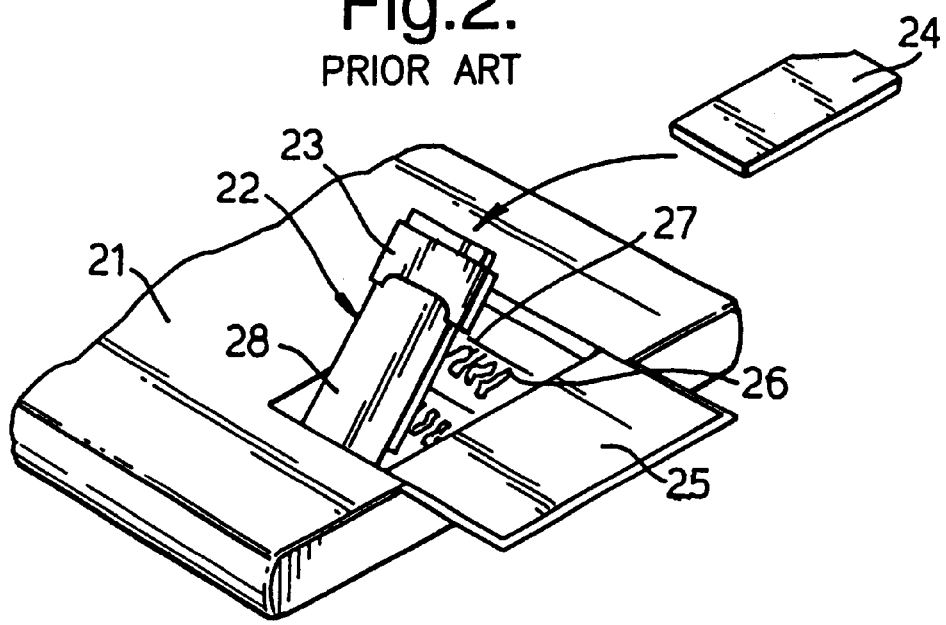
FIG. 2 illustrates a prior art arrangement for securing a plug-in SIM card in a mobile telephone.

FIGS. 3 to 6 are schematic views of a data card housing in a mobile phone according to a preferred embodiment of the present invention. The figures show the parts of the mobile phone alone that are necessary for illustrating the invention when implemented in a mobile phone.

Mobile phone housing 38 is provided with a SIM card housing 32. The SIM card housing 32 has a space being laterally defined by side walls 42 of the housing 32 and a transverse wall 43, and having a support surface 31 onto which the card is placed. The space has two regions, a loading region 33 and a reading region 34.

Figure 6:
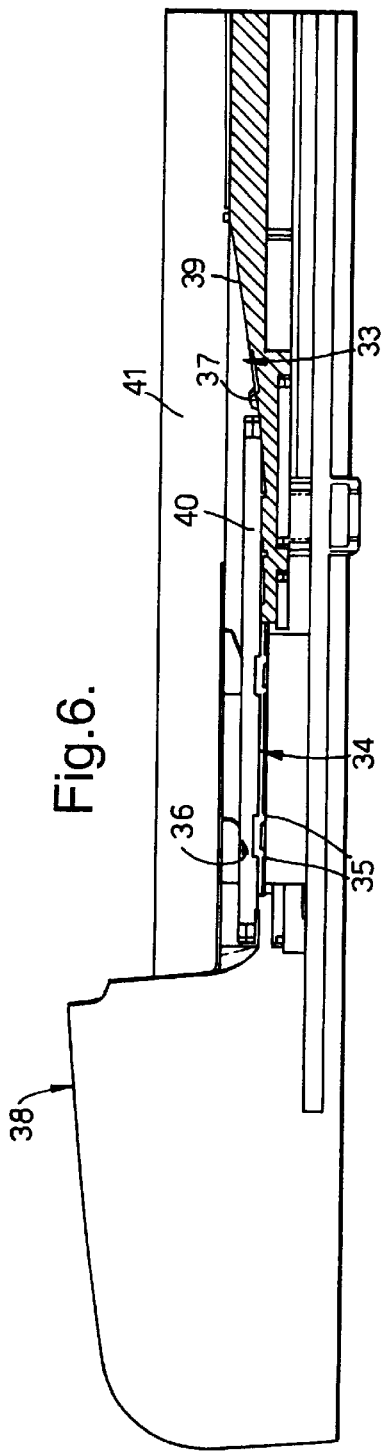
FIG. 6 is a cross section of the mobile telephone of FIG. 3 with the data card in the reading position.
Figure 7A:
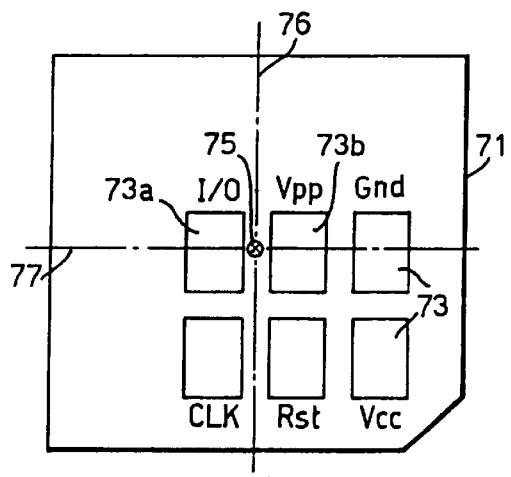
FIGS. 7(a)–7(d) shows the connections between the data card and the card reader, depending on which way around the card is inserted.
Figure 7B:
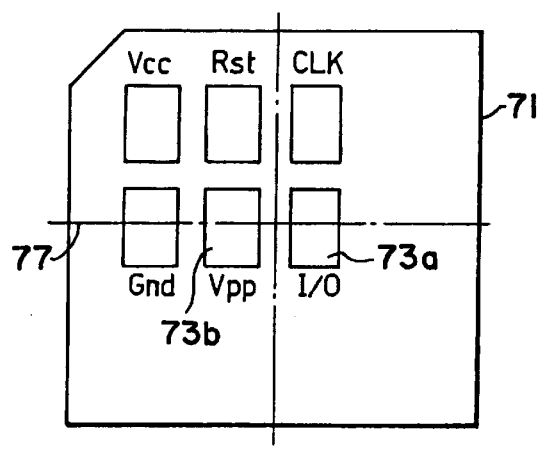
Figure 7C:
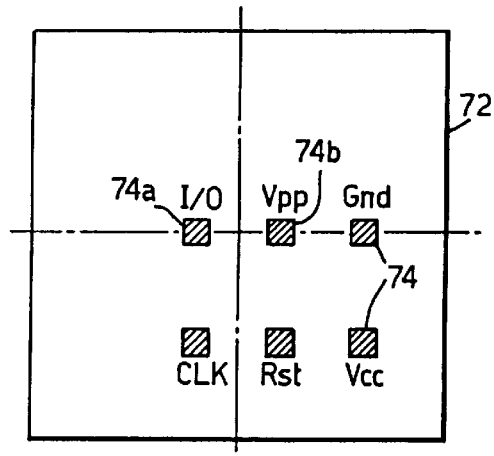
Figure 7D:
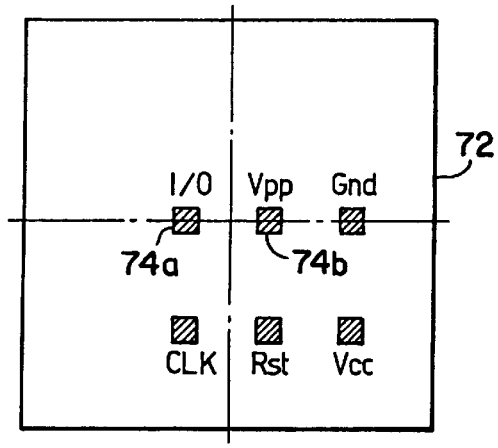

The support surface 31 has an opening for a SIM card connector in the reading region. The connector has a plurality of contacts 35 which, with a SIM card 40 in a reading position, will join corresponding contact areas on the card 40, as shown in FIG. 6. The support surface 31 in the loading region is sloped towards the reading region to act as a guide ramp 39 for the card 40.

Figure 3:
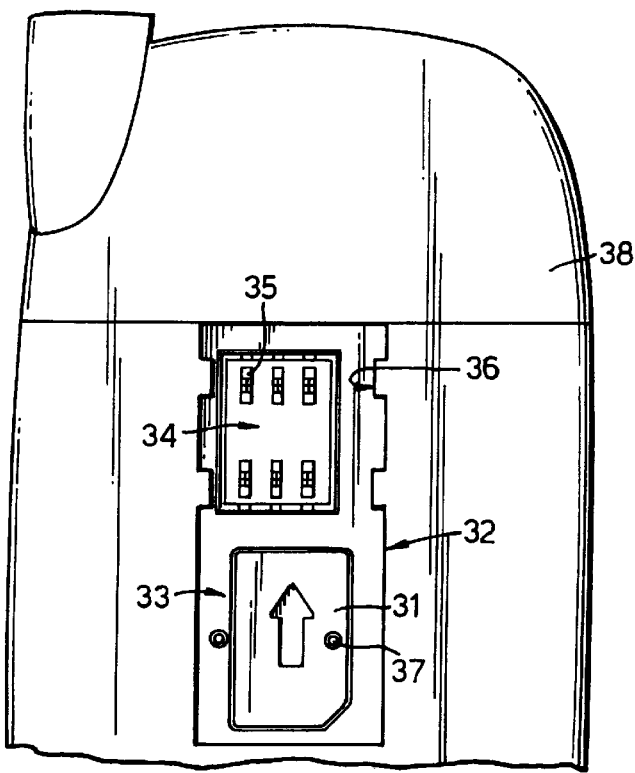
FIG. 3 is a top view of a mobile telephone comprising a data card housing according to an embodiment of the present invention.
Figure 4:
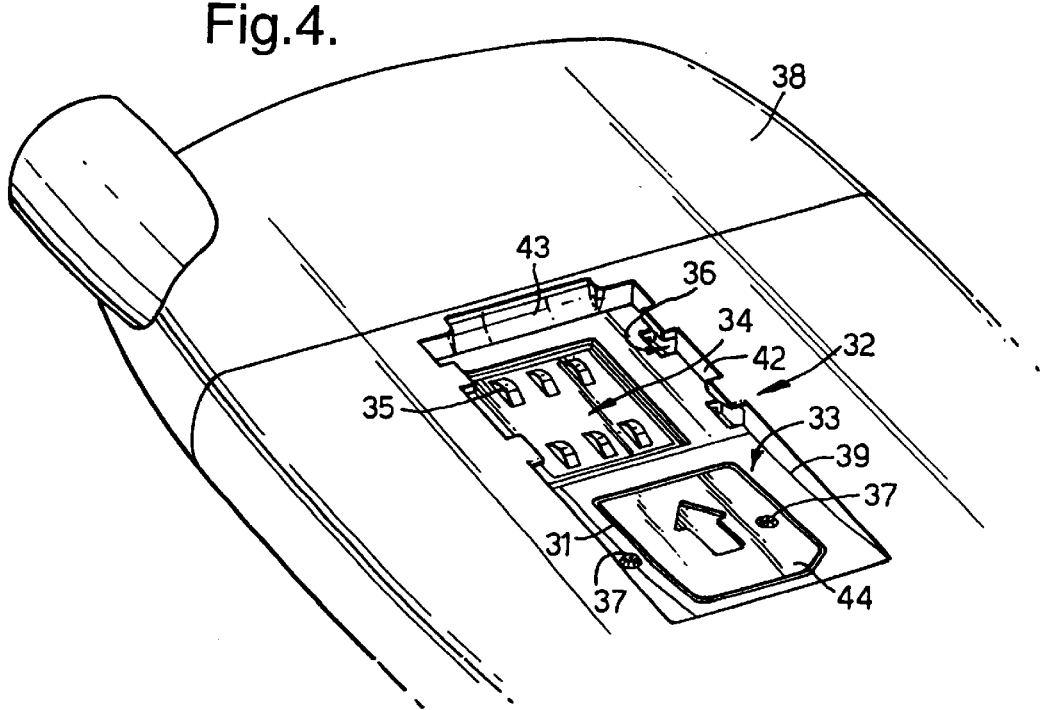
FIG. 4 is a perspective view of the mobile telephone of FIG. 3.
Figure 5:
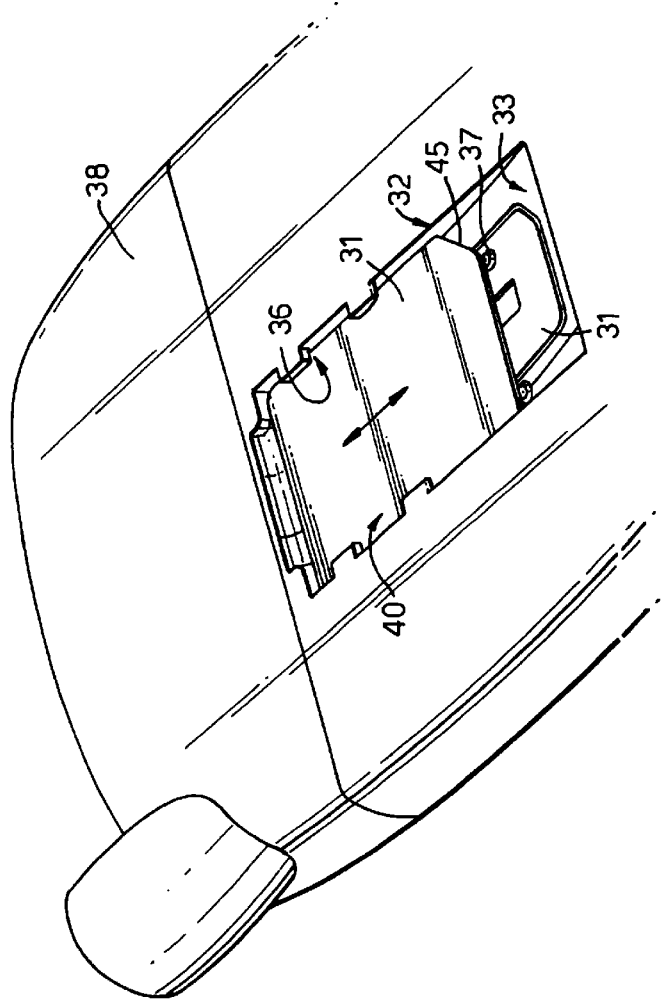
FIG. 5 is a perspective view of the mobile telephone of FIG. 3 with the data card in the reading position.

The side walls 42 are provided with guide grooves 36 in the reading region 34, the guide grooves 36 being defined by the support surface 31 and sized so that the card 40 edges engage them as the card 40 is inserted into position in the longitudinal direction of the mobile phone and the card 40, indicated by the arrow in FIGS. 3 and 4. The guide grooves 36 serve to position the card in the lateral direction, and to stop it essentially totally from moving in any direction other than the longitudinal one.

The transverse wall 43 of the SIM card housing 32 prevents the card from overshooting the reading position in the longitudinal direction when the card is inserted in the housing. The SIM card housing 32 is also provided with pips 37 on the supporting surface in the loading region, to prevent the card from moving from the reading position in a longitudinal direction back towards the loading region.

The space in this embodiment is covered by a battery 41, as is illustrated in FIG. 6. The battery 41 may, for example, comprise guides which engage corresponding guide grooves on the mobile phone 38. Alternatively, the space can be covered by a hinged lid, for example.

Insertion and removal of the SIM card 40 from the SIM card housing 32 occurs as follows. The SIM card 40 is inserted into the housing 32 by initially placing it in the loading region 33, either by sliding the card 40 in the longitudinal direction down the ramp 39 or by dropping it through the open face onto the ramp 39. Then, pressure is applied to the top surface 50 of the card, so that it is slid along the support surface 33 in the longitudinal direction towards the reading region 34. The SIM card 40 is inserted into the guide grooves 36 by the sliding action to prevent lateral movement of the card. Alignment of the card for insertion into the guide grooves is facilitated by the side walls 42 in the loading region. The card continues to be slid until it has completely cleared the pips 37 and its front edge contacts the transverse wall 43. Once the card has reached this position its contact areas communicate with the contacts 34 of the SIM card connector and it is in the reading position. The SIM card is retained in this position by the guide grooves 36 and the pips 37. Finally, in this embodiment, the battery 41 is attached to the mobile phone 38 by engaging its guides with the corresponding guide grooves on the mobile phone 38.

The SIM card 40 is removed from the housing 32, in this embodiment, by firstly detaching the battery 41 from the mobile phone 38. Then, pressure is applied to the top surface 50 of the card 40, so that it is slid along the support surface 31 in the longitudinal direction towards the loading region 33, and over the pips 37. The SIM card 40 continues to be slid until it is free of the guide grooves 36. Once the card has reached this position it can be removed from the SIM card housing, either by sliding it up the guide ramp 39 or tipping it out through the open face.

The SIM card can be damaged if it is inserted the wrong way around, so that incorrect connections are made between the SIM card connector contacts 35 and the contact pads of the SIM card. In view of this, the SIM card housing 32 and/or the SIM card 40 may be provided with suitable identification means 44, 45 respectively, so that the user can easily place the card 40 in the correct direction into the housing 32. In the present embodiment one of the corners 45 of the card 40 is sloped and an outline of the correct positioning of the card is impressed on the support surface 31 of the SIM card housing in the loading region, as is shown in FIGS. 3 and 4. As well as this attempt to get the user to insert the SIM card the correct way around, the preferred embodiment of the present invention protects against damage to the SIM card caused by incorrect insertion of the SIM card, as explained below.

FIG. 7 shows the correspondence of contacts of a data card 71 and a data card connector 72 for two orientations of the data card. In this embodiment, the connector 72 is arranged to couple a data card in the form of a SIM card having six contacts, to electronic circuitry of a radiotelephone. The SIM card and connector each have GND and VCC contacts for power to be applied to the SIM card, for example, from a battery of the radiotelephone. They also have control contacts, I/O (data), CLK, and RST, for transferring data between the SIM card and the phone. Finally, they have a VPP contact, which is conventionally used for applying a programming voltage to a SIM card, by connecting the VPP contact of the connector to VCC. However, in this embodiment of the present invention, the VPP contact of the connector is not connected to VCC, or indeed any circuitry of the phone. Instead, it is merely a terminal for the VPP contact of the SIM card.

In the first orientation (FIGS. 7a and 7c), the card 71 is the correct way round. In this case, the contacts 73 of the data card correspond to, and make contact with, the respective contacts 74 of the connector 72. In the second orientation (FIGS. 7b and 7b), the card is in the same plane as in the first orientation, but is rotated about a central axis 75, which is perpendicular to the major axes 76, 77 of the card. This results in the contacting of the I/O contact 74a of the connector 72 with the VPP contact 73b of the SIM card 71, and the VPP contact 74b of the connector 72 with the I/O contact 73a of the SIM card 71. As mentioned above, the VPP contact 74b of the connector 72 is not connected to the circuitry of the phone. Hence, the SIM card is only coupled to the phone circuitry via the I/O contact 74a of the connector 72 and the VPP contact 73b of the SIM card 71. Since only one of the SIM card contacts 74 is coupled to the circuitry, no specification interface violation occurs, and the SIM card 71 is consequently not prone to damage. By contrast, an interface violation could occur when more than one of the SIM card contacts 74 is coupled to the circuitry, as in such a case a contact 74 of the connector 72 and a respective contact 73 of the SIM card 71 might be at different voltages. Take for example, the arrangement of FIG. 7(b), but with the VPP contact 74b of the connector 72 connected to the VCC supply. In this case, the SIM card 71 would be coupled to the phone circuitry via the I/O contact 74a of the connector 72 and the VPP contact 73b of the SIM card 71 and also via the VPP contact 74b of the connector 72 and the I/O contact 73a of the SIM card 71. The VCC applied to the VPP contact 74b of the connector 72 would be forwarded to the I/O contact 73a of the SIM card 71. Also, it would cause the I/O contact 74a of the connector 72 to be forced to ground. The I/O contact 74a of the connector 72 would, in turn, forward the ground potential to the VPP contact 73b of the SIM card 71. Hence, the I/O contacts 73a, 74a would have different potentials and the VPP contact 73b of the SIM card 71 would be at ground potential, when it should be at VCC. Consequently, in contrast to the aforementioned embodiment of the present invention, there would be an interface violation and the incorrect potentials on the SIM card 71 could damage it.

If the card is located at the reading position in this second orientation, the card is not powered. Hence, it will not reply to the phone when the phone "talks" to it (e.g. requests data). Preferably the user is informed that the card has been inserted incorrectly, for example, by displaying an appropriate message on the telephone display.

The card could also be incorrectly located at the reading position in a third orientation, where the card is rotated 180 degrees from the first orientation, about its major axis 76. In this event, none of the contacts would make contact and the phone would not be able to "talk" to the card. Typically, in this case, the phone would indicate to the user that the card has been inserted incorrectly.

FIG. 8 shows data cards having various contact layouts, each data card shown located in the reading position of a data card housing according to embodiments of the present invention. The data cards are shown in a correct first orientation and a second orientation, in which the card is rotated 180 degrees from its first orientation, about a central axis, which is perpendicular to the major axes 81, 82 of the card. The contacts can be randomly placed on the card, or symmetrical as shown in FIG. 8. Also, they may appear as a conventional array, such as the 3×2 arrays of FIGS. 8(a) and (b) and the 2×3 array of FIG. 8(c), or as a pattern having some other form of symmetry, such as in FIG. 8(d). In each case, the data card connector has respective contacts positioned to correspond to the data card contacts when it is located at the reading position the correct way around.

When the card is in the second orientation, one or two of the connector contacts may make contact with data card contacts. For example, in FIGS. 8(a) and 8(c), they make contact with two data card contacts 83, 84 and 86, 87 and in FIGS. 8(c) and 8(d), they make contact with one data card contact 85 and 88. When the connector contacts make contact with two data card contacts, only one of the connector contacts couples one of the data card contacts to the electronic circuitry of the phone. The second connector contact is a terminal contact for the other data card contact. Consequently, voltages from the phone will not be likely to damage the data card.

Figure 8A:
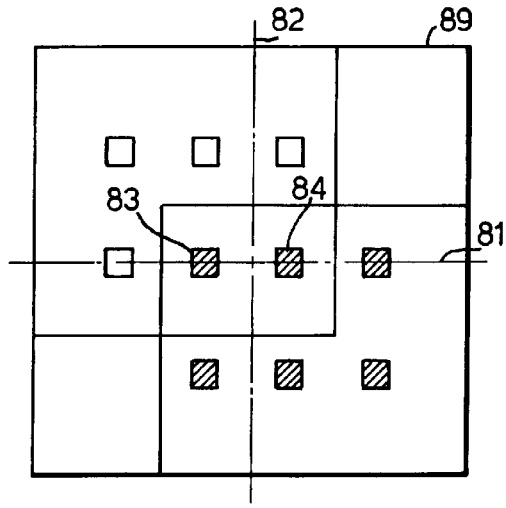
FIGS. 8(a)–8(d) shows data cards having various contact layouts, each data card shown located in the reading position in both a correct first orientation and a second orientation, 180 degrees rotated from the first.
Figure 8B:
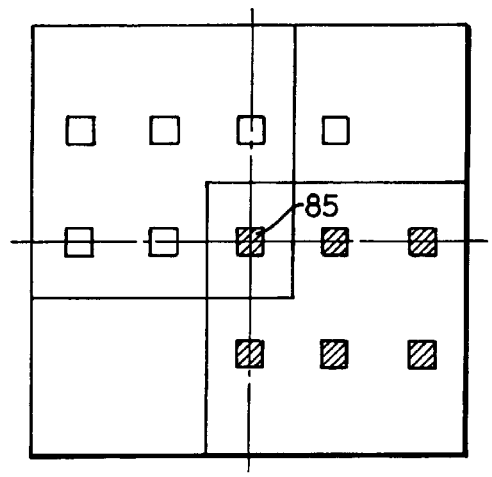
Figure 8C:
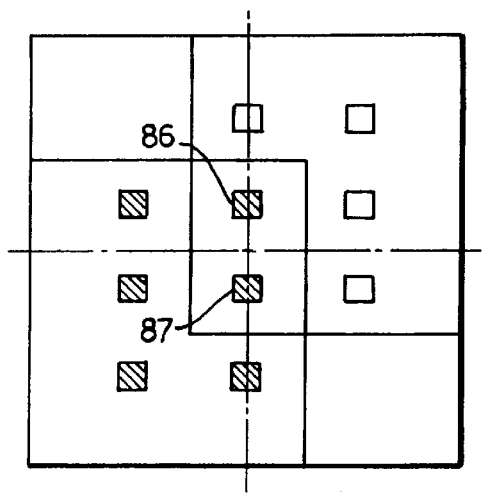
Figure 8D:
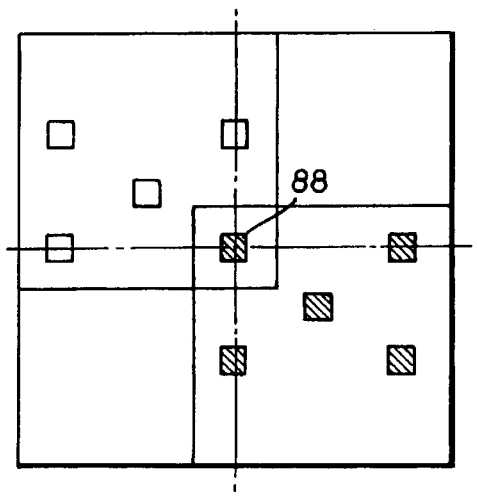

When the connector contacts are arranged to make contact with two data card contacts, a smaller connector and data card can be used for the same data card contact arrangement. This can be seen from FIGS. 8(a) and (b). In FIG. 8(a), the connector contacts make contact with two data card contacts 83, 84, in the second orientation, whereas in FIG. 8(b) they only contact one data card connector 85. Consequently, the width of the card, and thus connector, (i.e. the distance along major axis 81), can be shorter in the former, by the distance between the centre of contacts 83 and 84, for example. Alternatively, for the same size SIM card, it enables the contacts to be spaced further apart along axis 81, so that short circuits are less likely to occur.

In view of the foregoing description it would be evident to a person skilled in the art that various modifications may be made within the scope of the claims. For example, the loading region 33 of the data card housing may have a flat supporting surface 31 as opposed to a guide ramp, and the data card connector may comprise more than one terminal contact.

What is claimed is:

1. A data card housing for receiving a data card, comprising: a recess including: a reading region in which the card is located at a reading position, the reading region including a channel portion of the recess for guiding the card to the reading position and a loading region having a supporting surface, for guiding the card to the channel portion of the recess; the recess being substantially open to permit access to a major face of the card in the reading region and in the loading region, so that force can be applied to the major face of the card, to slide the card along the supporting surface into the channel portion and so that force can be applied to the major face of the card in the reading region to further slide the card into the reading position.

2. A housing as in claim 1 wherein the supporting surface of the loading region slopes toward a bottom surface of the recess at the channel portion.

3. A housing as in claim 2 wherein the supporting surface of the loading region comprises a ramp.

4. A housing as in claim 2 wherein the open recess permits a force to be applied to the major face of the card to slide the card in an opposing direction for removal of the card from the housing.

5. A housing as in claim 2 comprising means associated with the recess for retaining the card in the reading position.

6. A housing as in claim 5 wherein the retaining means comprises at least one protrusion in the supporting surface of the loading region.

7. An assembly comprising a data card and a data card housing for receiving the data card, wherein:

the housing includes a recess comprising: a reading region in which the card is located at a reading position, the reading region including a channel portion of the recess for guiding the card to the reading position and a loading region having a supporting surface for guiding the card to the channel portion of the recess; the recess being substantially open to permit access to a major face of the card in the reading region and in the loading region, so that force can be applied to the major face of the card, to slide the card along the supporting surface into the channel portion and so that force can be applied to the major face of the card in the reading region to further slide the card into the reading position.

8. An assembly as in claim 7 wherein the supporting surface of the loading region slopes toward a bottom surface of the recess at the channel portion.

9. An assembly as in claim 8 wherein the supporting surface of the loading region comprises a ramp.

10. An assembly as in claim 8 wherein the open recess permits a force to be applied to the major face of the card to slide the card in an opposing direction for removal of the card from the housing.

11. An assembly as in claim 7 wherein the data card has data card contacts and wherein the housing at the reading position includes connector contacts for contacting the data card contacts to couple the data card contacts to circuitry.

12. An assembly as in claim 11 wherein the connector contacts are positioned to contact respective data card contacts when the data card is located in the reading position in a first orientation and the connector contacts are positioned so that only one data card contact is contacted by any one of the connector contacts coupled to circuitry when the data card is located at the reading position in a second orientation, 180 degrees rotated from the first orientation.

13. An assembly as in claim 11 wherein the connector contacts are positioned to contact more than two respective data card contacts when the data card is located at the reading position in a first orientation, and wherein only two data card contacts are contacted by the connector contacts when the data card is located in the reading position in a second orientation, 180 degrees rotated from the first orientation.

14. A radiotelephone including a data card housing for receiving a data card, including:

a recess comprising, a reading region in which the card is located at a reading position, the reading region including a channel portion of the recess for guiding the card to the reading position and a loading region having a supporting surface for guiding the card to the channel portion of the recess; the recess being substantially open to permit access to a major face of the card in the reading region and in the loading region, so that force can be applied to the major face of the card, to slide the card along the supporting surface into the channel portion and so that force can be applied to the major face of the card in the reading region to further slide the card into the reading position.

15. A radio telephone as in claim 14 wherein the supporting surface of the loading region slopes toward a bottom surface of the recess at the channel portion.

16. A radio telephone as in claim 15 wherein the supporting surface of the loading region comprises a ramp.

17. A radio telephone as in claim 15 wherein the open recess permits a force to be applied to the major face of the card to slide the card in an opposing direction for removal of the card from the housing.

18. A radiotelephone as in claim 14 further comprising a detachable battery, which when attached to the radiotelephone covers the data card housing.

\* \* \* \* \*